US012643983B2

(12) United States Patent
Nakayama et al.

(10) Patent No.: US 12,643,983 B2
(45) Date of Patent: Jun. 2, 2026

(54) METHOD FOR PRODUCING CYCLIC POLYSILOXANE

(71) Applicant: SHIN-ETSU CHEMICAL CO., LTD., Tokyo (JP)

(72) Inventors: Ken Nakayama, Annaka (JP); Shunji Aoki, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 852 days.

(21) Appl. No.: 17/801,192

(22) PCT Filed: Feb. 16, 2021

(86) PCT No.: PCT/JP2021/005600
§ 371 (c)(1),
(2) Date: Aug. 19, 2022

(87) PCT Pub. No.: WO2021/166871
PCT Pub. Date: Aug. 26, 2021

(65) Prior Publication Data

US 2023/0095953 A1 Mar. 30, 2023

(30) Foreign Application Priority Data

Feb. 21, 2020 (JP) ................................ 2020-027966

(51) Int. Cl.
*C08G 77/08* (2006.01)
*C07F 7/21* (2006.01)
*C08G 77/24* (2006.01)
*C08G 77/385* (2006.01)

(52) U.S. Cl.
CPC ................ *C08G 77/24* (2013.01); *C07F 7/21* (2013.01); *C08G 77/08* (2013.01); *C08G 77/385* (2013.01)

(58) Field of Classification Search
CPC ........................................................ C07F 7/21
USPC ........................................................ 556/460
See application file for complete search history.

(56) References Cited

U.S. PATENT DOCUMENTS 3,101,361 A * 8/1963 Brown .................. C07F 7/0876 556/451
3,590,064 A * 6/1971 Lacefield .............. C07F 7/0874 556/451
3,642,851 A * 2/1972 Bennett ................ B01J 31/0271 556/452
4,855,379 A 8/1989 Budnik et al.
5,233,070 A * 8/1993 Bokerman ............. C08G 77/10 556/460
7,189,868 B2 * 3/2007 Uehara ..................... C07F 7/21 556/460
2005/0038219 A1 2/2005 Lai et al.
2006/0264649 A1 11/2006 Uehara et al.

FOREIGN PATENT DOCUMENTS

| | | | |
|---|---|---|---|
| JP | 60-163887 | A | 8/1985 |
| JP | 63-14787 | A | 1/1988 |
| JP | 1-281135 | A | 11/1989 |
| JP | 7-149902 | A | 6/1995 |
| JP | 9-59383 | A | 3/1997 |
| JP | 2000-159782 | A | 6/2000 |
| JP | 2005-139123 | A | 6/2005 |
| JP | 2007-23021 | A | 2/2007 |
| JP | 2015-182980 | A | 10/2015 |
| JP | 2017-145231 | A | 8/2017 |
| JP | 2018-172321 | A | 11/2018 |

OTHER PUBLICATIONS

Extended European Search Report for European Application No. 21757153.8, dated Apr. 9, 2024.
International Search Report for PCT/JP2021/005600 mailed on Apr. 6, 2021.
Written Opinion of the International Searching Authority for PCT/JP2021/005600 mailed on Apr. 6, 2021.

* cited by examiner

*Primary Examiner* — Margaret G Moore
(74) *Attorney, Agent, or Firm* — Birch, Stewart, Kolasch & Birch, LLP

(57) ABSTRACT

A method for producing a cyclic polysiloxane that includes a step for reacting a raw material cyclic siloxane and a dihalosilane in association with ring-opening of the cyclic siloxane in the presence of at least one catalyst selected from Lewis base compounds having a carbonamide bond represented by —C(═O)N<, phosphorus compounds having a P═O bond, quaternary ammonium salts, and quaternary phosphonium salts to obtain a linear polysiloxane with both ends of the molecular chain blocked by halogen atoms and a step for obtaining a cyclic polysiloxane by reacting the linear polysiloxane with both ends of the molecular chain blocked by halogen atoms with water makes it possible to provide a method for producing a cyclic polysiloxane that obtains a cyclic polysiloxane at high yield and high purity by simple steps and under moderate conditions.

14 Claims, 3 Drawing Sheets

METHOD FOR PRODUCING CYCLIC POLYSILOXANE

TECHNICAL FIELD

This invention relates to a method for producing a cyclic polysiloxane.

BACKGROUND ART

Cyclic polysiloxanes are used in a variety of applications in diverse fields.

For example, methods are known for producing high-molecular-weight silicone oils, silicone resins and silicone rubbers by reacting cyclic polysiloxanes having various functional groups, either alone or with another type of cyclic or acyclic siloxane compound, in the presence of an acid or alkali as an equilibration reaction catalyst. Depending on the types of functional groups from the starting materials, improvements in various performances are brought about in the high-molecular weight material thus produced.

In addition, cyclic polysiloxanes are also used as diluents for cosmetic materials, as dry cleaning solvents and as starting materials for insulating films.

With regard to methods for synthesizing cyclic polysiloxanes, a number of synthesis examples have been reported in the past.

For example, Patent Document 1 discloses art which synthesizes 1,3,5,7-tetramethylcyclotetrasiloxane by the use of aluminum triisopropoxide on a SiH group-containing linear polysiloxane.

[Chem. 1]

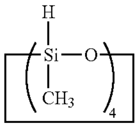

Patent Document 2 discloses art which synthesizes the following cyclic polysiloxane by treating trihydroxyphenylsilane with methanesulfonic acid.

[Chem. 2]

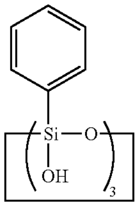

Patent Document 3 discloses art which synthesizes the cyclic polysiloxane shown below by condensing n-octyltrichlorosilane with water, and then treating with 1,1,3,3-tetramethyldisilazane and dimethylchlorosilane.

[Chem. 3]

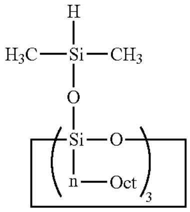

Examples of the synthesis of cyclic polysiloxanes having two or more differing siloxane units within the structure of a single molecule have also been reported.

In Patent Document 4, the following cyclic polysiloxane is synthesized using a Lewis acid catalyst-mediated demethanation reaction on dimethoxyisopropylvinylsilane and 1,1,3,3-tetramethyldisiloxane.

[Chem. 4]

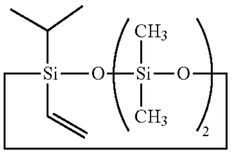

In Patent Document 5, 1,1,3,3,5-pentamethylcyclotrisiloxane is synthesized by a condensation reaction between 1,3-dihydroxy-1,1,3,3-tetramethyldisiloxane and methyldichlorosilane in the presence of triethylamine.

[Chem. 5]

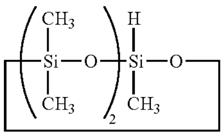

Patent Document 6 describes the synthesis of cyclic polysiloxanes having a fluorine-containing organic group at Z in the formula below. Four types of synthesis method are used in this document: (1) a synthesis method in which dimethyldichlorosilane and dichlorosilane having a fluorine-containing organic group are co-hydrolyzed; (2) a synthesis method in which a hydrosilane-type cyclosiloxane obtained by the co-hydrolysis of dimethyldichlorosilane and methyldichlorosilane is subjected to a hydrosilylation reaction with a fluorine-containing olefin; (3) a synthesis method in which a vinyl-type cyclosiloxane obtained by the co-hydrolysis of dimethyldichlorosilane and methylvinyldichlorosilane is subjected to a hydrosilylation reaction with a fluorine-containing hydrosilane; and (4) a synthesis method in which a perfluoroalkyl iodide is added to a vinyl-type cyclosiloxane obtained by the co-hydrolysis of dimethyldichlorosilane and methylvinyldichlorosilane to form an iodine-substituted cyclosiloxane, following which reduction is carried out.

[Chem. 6]

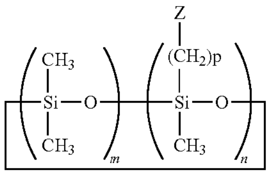

In Patent Documents 7 to 9, the respective cyclic polysiloxanes shown below are synthesized by using hexamethylphosphoric triamide (HMPA) on cyclic siloxane and dichlorosilane, followed by hydrolysis.

Patent Document 7: 1-Vinyl-1,3,3,5,5,7,7-heptamethylcyclotetrasiloxane

[Chem. 7]

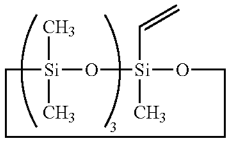

Patent Document 8: The cyclic polysiloxane of the following formula

[Chem. 8]

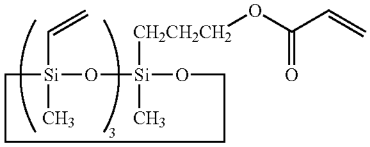

Patent Document 9: The cyclic polysiloxanes of the following formulas

[Chem. 9]

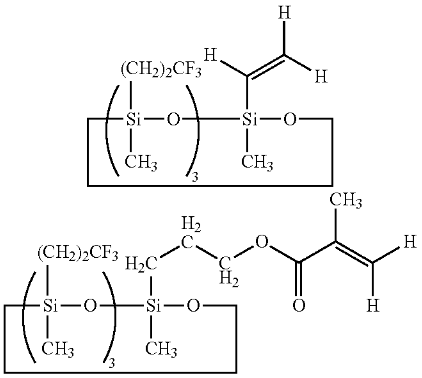

PRIOR ART DOCUMENTS

Patent Documents

Patent Document 1: JP-A 2005-139123
Patent Document 2: JP-A 2015-182980
Patent Document 3: JP-A 2017-145231
Patent Document 4: JP-A 2018-172321
Patent Document 5: JP-A H09-59383
Patent Document 6: JP-A S60-163887
Patent Document 7: JP-A H01-281135
Patent Document 8: JP-A S63-14787
Patent Document 9: JP-A 2007-23021

SUMMARY OF INVENTION

Technical Problem

With regard to the above methods for producing cyclic polysiloxanes, in Patent Documents 1 to 3, the functional groups on the resulting cyclic polysiloxanes are limited in each case. Also, cyclic trimers, tetramers, pentamers and the like form at the same time, making it difficult to obtain a single constituent in high yield.

Patent Document 4 is limited to vinyl group-containing cyclic polysiloxanes. Also, because it uses a reagent having the high activity of a strong Lewis acid, by-products form and the yield of the target cyclic polysiloxane is low.

Patent Document 5 is a synthesis method in which two types of starting materials are added dropwise at the same speed and at the same time. As a result, production is complicated and the yield obtained is low.

In Patent Document 6, because a silane co-hydrolysis reaction is carried out in all of the synthesis methods, the reaction yield is low, in addition to which the cyclic polysiloxane degree of polymerization is unstable.

In Patent Documents 7 to 9, the functional groups on the resulting cyclic polysiloxanes are limited in each case. Moreover, the examples use only hexamethylphosphoric triamide (HMPA), which is carcinogenic, as the catalyst.

As shown above, in prior-art methods for producing cyclic polysiloxanes, there are no known synthesis processes which enable easy synthesis without the use of toxic catalysts and by means of which target cyclic polysiloxanes having various functional groups can be obtained in high yield and purity.

The present invention was arrived at in light of the above circumstances. The object of the invention is to provide a cyclic polysiloxane production method which is capable of obtaining a cyclic polysiloxane in high yield and purity without resorting to the use of a toxic catalyst, by way of simple steps and under mild conditions.

Solution to Problem

The inventors have conducted intensive investigations aimed at achieving the above objects and discovered as a result that a cyclic polysiloxane compound can be obtained in high yield and purity by reacting a cyclic siloxane with a dihalosilane in the presence of at least one type of catalyst selected from Lewis base compounds having a carboxamide bond of the formula —C(═O)N<, a phosphorus compound having a P═O bond, quaternary ammonium salts and quaternary phosphonium salts to synthesize a linear polysiloxane capped at both ends of the molecular chain with halogen atoms as the synthesis intermediate, and then hydrolyzing this intermediate compound.

Accordingly, this invention provides the following method for producing a cyclic polysiloxane.

1. A method for producing a cyclic polysiloxane, which method includes the steps of:

reacting a starting cyclic siloxane of general formula (1) below

[Chem. 10]

(1)

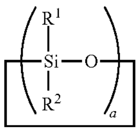

(wherein $R^1$ and $R^2$ are each independently a hydrogen atom or a substituted or unsubstituted monovalent hydrocarbon group of 1 to 10 carbon atoms, and the subscript 'a' is an integer such that $3 \leq a \leq 5$) with a dihalosilane of general formula (2) below

[Chem. 11]

(2)

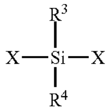

(wherein $R^3$ and $R^4$ are each independently a hydrogen atom or a substituted or unsubstituted monovalent hydrocarbon group of 1 to 20 carbon atoms (exclusive of fluorine-containing monovalent hydrocarbon groups), and X is a halogen atom), accompanied by ring opening of the cyclic siloxane of general formula (1), in the presence of one or more catalyst selected from the group consisting of Lewis base compounds having a carboxamide bond of the formula —C(═O)N<, phosphorus compounds having a P═O bond, quaternary ammonium salts and quaternary phosphonium salts to obtain a linear polysiloxane capped at both ends of the molecular chain with halogen atoms; and reacting the resulting linear polysiloxane capped at both ends of the molecular chain with halogen atoms with water to obtain a cyclic polysiloxane of general formula (3) below

[Chem. 12]

(3)

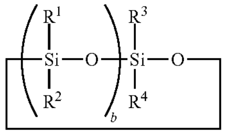

(wherein $R^1$ and $R^2$ are each independently a hydrogen atom or a substituted or unsubstituted monovalent hydrocarbon group of 1 to 10 carbon atoms, $R^3$ and $R^4$ are each independently a hydrogen atom or a substituted or unsubstituted monovalent hydrocarbon group of 1 to 20 carbon atoms (exclusive of fluorine-containing monovalent hydrocarbon groups), and the subscript 'b' is an integer such that 3 b 10).

2. The cyclic polysiloxane production method of 1 above wherein, in general formulas (1) and (3), $R^1$ and $R^2$ are each independently an unsubstituted monovalent hydrocarbon group of 1 to 10 carbon atoms.

3. The cyclic polysiloxane production method of 2 above wherein, in general formulas (1) and (3), $R^1$ and $R^2$ are methyl groups.

4. The cyclic polysiloxane production method of any of 1 to 3 above wherein, in general formulas (2) and (3), $R^3$ and $R^4$ are hydrogen atoms or unsubstituted monovalent hydrocarbon groups of 1 to 10 carbon atoms.

5. A method for producing a cyclic polysiloxane, which method includes the steps of:

reacting a starting cyclic siloxane of general formula (1') below

[Chem. 13]

(1')

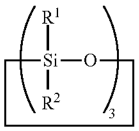

(wherein $R^1$ and $R^2$ are each independently a hydrogen atom or a substituted or unsubstituted monovalent hydrocarbon group of 1 to 10 carbon atoms) with a dichlorosilane of general formula (2') below

[Chem. 14]

(2')

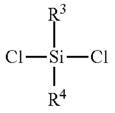

(wherein $R^3$ and $R^4$ are each independently a hydrogen atom or a substituted or unsubstituted monovalent hydrocarbon group of 1 to 20 carbon atoms (exclusive of fluorine-containing monovalent hydrocarbon groups)), accompanied by ring opening of the cyclic siloxane of general formula (1'), in the presence of one or more catalyst selected from the group consisting of Lewis base compounds having a carboxamide bond of the formula —C(═O)N<, phosphorus compounds having a P═O bond, quaternary ammonium salts and quaternary phosphonium salts to obtain a linear polysiloxane capped at both ends of the molecular chain with chlorine atoms; and reacting the resulting linear polysiloxane capped at both ends of the molecular chain with chlorine atoms with water to obtain a cyclic polysiloxane of general formula (3') below

[Chem. 15]

(3')

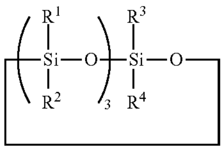

(wherein $R^1$ and $R^2$ are each independently a hydrogen atom or a substituted or unsubstituted monovalent hydrocarbon group of 1 to 10 carbon atoms, and $R^3$ and $R^4$ are each independently a hydrogen atom or a substituted or unsubstituted monovalent hydrocarbon group of 1 to 20 carbon atoms (exclusive of fluorine-containing monovalent hydrocarbon groups)).

6. The cyclic polysiloxane production method of 5 above wherein, in general formulas (1') and (3'), $R^1$ and $R^2$ are each independently an unsubstituted monovalent hydrocarbon group of 1 to 10 carbon atoms.

7. The cyclic polysiloxane production method of 6 above wherein, in general formulas (1') and (3'), $R^1$ and $R^2$ are methyl groups.

8. The cyclic polysiloxane production method of any of 5 to 7 above wherein, in general formulas (2') and (3'), $R^3$ and $R^4$ are hydrogen atoms or unsubstituted monovalent hydrocarbon groups of 1 to 10 carbon atoms.

9. The cyclic polysiloxane production method of any of 1 to 8 above, wherein the catalyst is one or more selected from the group consisting of Lewis base compounds having a tertiary amide bond and phosphine oxides.

10. The cyclic polysiloxane production method of 9 above, wherein the catalyst is one or more selected from the group consisting of N,N-dimethylformamide, tetramethylurea, 1,3-dimethyl-3,4,5,6-tetrahydro-2(1H)-pyrimidinone, 1,3-dimethyl-2-imidazolidinone, trimethylphosphine oxide, triethylphosphine oxide, tri-n-propylphosphine oxide, tributylphosphine oxide, tri-n-octylphosphine oxide, tris(2-ethylhexyl)phosphine oxide, tricyclohexylphosphine oxide, triphenylphosphine oxide, methyl(diphenyl)phosphine oxide, ethyldiphenylphosphine oxide, diphenylvinylphosphine oxide, ethynyl(diphenyl)phosphine oxide, methoxymethyl(diphenyl)phosphine oxide and cyclohexyldiphenylphosphine oxide.

Advantageous Effects of Invention

The inventive method for producing a cyclic polysiloxane is able to obtain a cyclic polysiloxane in high yield and purity without resorting to the use of toxic catalysts, by way of simple steps and under mild conditions. By using the synthesized cyclic polysiloxane as the starting material for high-molecular-weight silicone oils and silicone rubbers, it is possible to further improve the characteristics and impart novel properties. In addition, the cyclic polysiloxane can also be used as a diluent for cosmetic materials, as a dry cleaning solvent and as a starting material for dielectric films.

BRIEF DESCRIPTION OF THE DIAGRAMS

DESCRIPTION OF EMBODIMENTS

Figure 1:
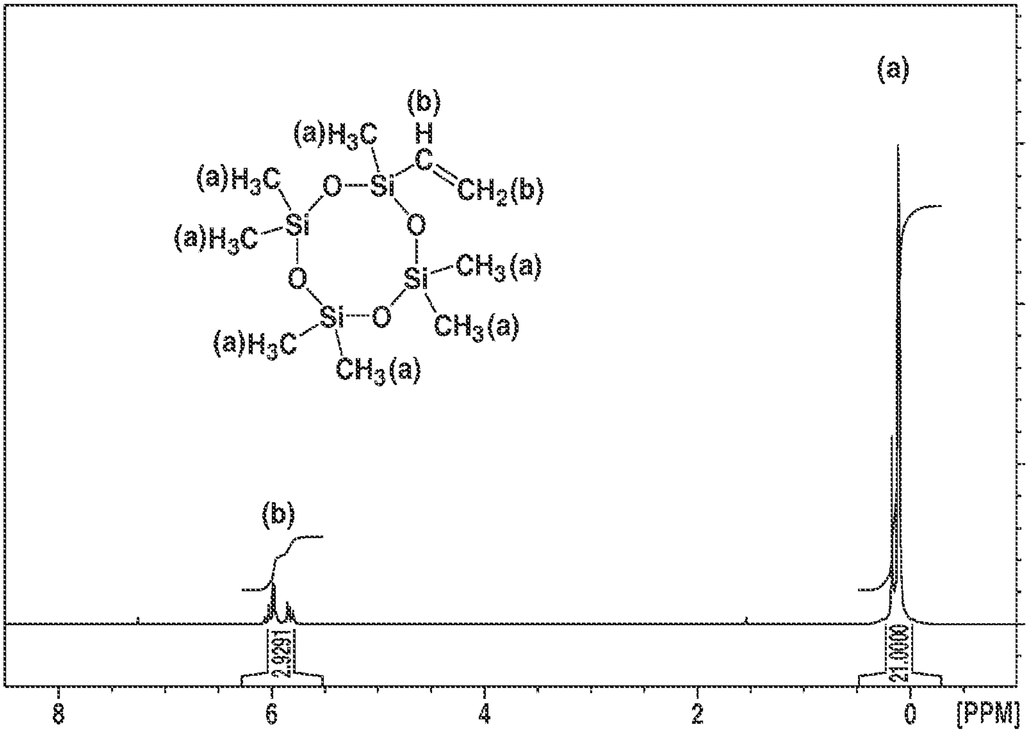
FIG. 1 shows the $^1$H-NMR spectrum (solvent, $CDCl_3$) for the cyclic polysiloxane (3-1) obtained in Example 1.

The inventive method for producing a cyclic polysiloxane is described in detail below.

The method of the invention has two steps:

[I] the step of reacting a starting cyclic siloxane of general formula (1) with a dihalosilane of general formula (2), accompanied by ring opening of the cyclic siloxane of general formula (1), in the presence of one or more catalyst selected from the group consisting of Lewis base compounds having a carboxamide bond of the formula —C(═O)N<, phosphorus compounds having a P═O bond, quaternary ammonium salts and quaternary phosphonium salts to obtain a linear polysiloxane capped at both ends of the molecular chain with halogen atoms; and

[II]

the step of reacting the resulting linear polysiloxane capped at both ends of the molecular chain with halogen atoms with water to obtain the target cyclic polysiloxane of general formula (3).

Step [I]

Describing Reaction [I] in greater detail, this is the step of reacting a cyclic siloxane of general formula (1) with a dihalosilane of general formula (2) in the presence of one or more catalyst selected from the group consisting of Lewis base compounds having a carboxamide bond of the formula —C(═O)N<, phosphorus compounds having a P═O bond, quaternary ammonium salts and quaternary phosphonium salts and, by opening the cyclic structure of the cyclic siloxane of general formula (1), producing a linear polysiloxane in which both ends of the molecular chain are capped with halogen atoms as a synthesis intermediate of general formula (3") below (wherein X, $R^1$, $R^2$, $R^3$, $R^4$, a and b are as defined above). This step is represented by reaction formula (I) below and is referred to hereinafter as the "ring-opening reaction."

[Chem. 16]

Reaction formula (I)

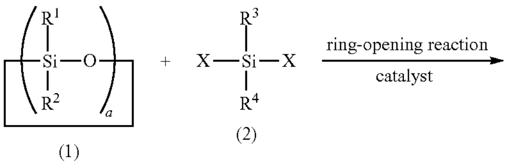

(1) (2)

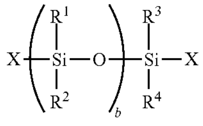

(3")

In the reaction, $R^1$ and $R^2$ are each independently a hydrogen atom or a substituted or unsubstituted monovalent hydrocarbon group of 1 to 10 carbon atoms, and the subscript 'a' is an integer such that $3 \leq a \leq 5$. $R^3$ and $R^4$ are each independently a hydrogen atom or a substituted or unsubstituted monovalent hydrocarbon group of 1 to 20 carbon atoms (exclusive of fluorine-containing monovalent hydrocarbon groups), and X is a halogen atom. $R^3$ and $R^4$ are each independently a hydrogen atom or a substituted or unsubstituted monovalent hydrocarbon group of 1 to 20 carbon atoms (exclusive of fluorine-containing monovalent hydrocarbon groups), and b is an integer such that 3 b 10.

[Starting Cyclic Siloxane]

In this invention, the cyclic siloxane used as the starting material is represented by general formula (1) below

[Chem. 17]

(1)

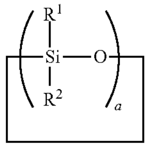

(wherein $R^1$ and $R^2$ are each independently a hydrogen atom or a substituted or unsubstituted monovalent hydrocarbon group of 1 to 10 carbon atoms, and the subscript 'a' is an integer such that $3 \leq a \leq 5$).

Here, examples of the monovalent hydrocarbon group of $R^1$ and $R^2$ include alkyl groups of preferably 1 to 8 carbon atoms, such as methyl, ethyl, propyl and butyl groups; cycloalkyl groups of preferably 5 to 8 carbon atoms, such as the cyclohexyl group; alkenyl groups of preferably 2 to 8 carbon atoms, such as vinyl, allyl, hexenyl and octenyl groups; cycloalkenylalkyl groups of preferably 3 to 8 carbon atoms, such as the cyclohexenylethyl group; acryloylalkyl and methacryloylalkyl groups of preferably 4 to 10 carbon atoms, such as acryloylpropyl, acryloylmethyl and methacryloylpropyl groups; aryl groups of preferably 6 to 10 carbon atoms, such as phenyl and tolyl groups; aralkyl groups of preferably 7 to 10 carbon atoms, such as the benzyl group; and monovalent hydrocarbon groups of 1 to 10 carbon atoms in which some or all hydrogen atoms bonded to carbon atoms in the foregoing groups are substituted with, for example, hydroxyl groups, cyano groups, halogen atoms, alkoxysilyl groups, polyoxyalkylene groups, epoxy groups or carboxyl groups. Of these, unsubstituted monovalent hydrocarbon groups of 1 to 10 carbon atoms and the 3,3,3-trifluoropropyl group are preferred; methyl, vinyl and 3,3,3-trifluoropropyl groups are more preferred; and methyl groups are even more preferred.

The subscript 'a' is an integer such that $3 \leq a \leq 5$, and preferably a=3 (above general formula (1')).

[Dihalosilane]

The dihalosilane used as the other starting material is a compound having general formula (2) below

[Chem. 18]

(2)

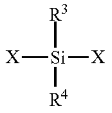

(wherein $R^3$ and $R^4$ are each independently a hydrogen atom or a substituted or unsubstituted monovalent hydrocarbon group of 1 to 20 carbon atoms (exclusive of fluorine-containing monovalent hydrocarbon groups)).

Examples of the monovalent hydrocarbon group of $R^3$ and $R^4$ include alkyl groups of preferably 1 to 12 carbon atoms, such as methyl, ethyl, propyl and butyl groups; cycloalkyl groups of preferably 5 to 12 carbon atoms such as the cyclohexyl group; alkenyl groups of preferably 2 to 12 carbon atoms, such as vinyl, allyl, hexenyl and octenyl groups; cycloalkenylalkyl groups of preferably 3 to 12 carbon atoms such as the cyclohexenylethyl group; acryloylalkyl and methacryloylalkyl groups of preferably 4 to 12 carbon atoms such as acryloylpropyl, acryloylmethyl and methacryloylpropyl groups; aryl groups of preferably 6 to 12 carbon atoms, such as phenyl and tolyl groups; aralkyl groups of preferably 7 to 12 carbon atoms such as the benzyl group; and monovalent hydrocarbon groups of 1 to 20 carbon atoms in which some or all hydrogen atoms bonded to carbon atoms in the foregoing groups are substituted with, for example, hydroxyl groups, cyano groups, halogen atoms, alkoxysilyl groups, polyoxyalkylene groups, epoxy groups or carboxyl groups. Of these, unsubstituted monovalent hydrocarbon groups of 1 to 20 carbon atoms are preferred; methyl, vinyl and phenyl groups are more preferred.

X is a halogen atom, examples of which include chlorine, bromine and iodine atoms. Chlorine atoms are preferred (general formula (2') above).

The molar ratio of the compound of general formula (1) to the compound of formula (2) in the ring-opening reaction (I) may be any suitable ratio without particular limitation and is suitably selected within a range where b is an integer such that 3 b 10. The amount of the compound of formula (1) per mole of the compound of formula (2) is preferably from 0.8 to 5 moles, and more preferably from 0.8 to 3 moles. An amount that is less than 0.8 mole or more than 5 moles may be economically disadvantageous and may give rise to the formation of impurities of a sort that interfere with purification of the target substance.

[Catalyst]

One or more catalyst selected from the following is used as the catalyst for the ring-opening reaction: Lewis base compounds having a carboxamide bond of the formula —C(=O)N<, phosphorus compounds having a P=O bond, quaternary ammonium salts and quaternary phosphonium salts. The catalyst may be of one type used alone or two or more may be used together.

Any carboxamide compound, urethane compound or urea compound may be used as a Lewis base compound having a carboxamide bond. From the standpoint of the reaction efficiency, a Lewis base compound which does not have a hydrogen atom directly bonded to a nitrogen atom and has a tertiary amide bond is preferred.

Examples of carboxamide compounds include N,N-dimethylformamide, N,N-dimethylacetamide, N,N-dimethylpropionamide, N,N-dimethylisobutylamide, N,N-dimethylacrylamide, N,N-dimethylmethacrylamide, N,N-dimethylacetoacetamide, N,N-diethylformamide, N,N-diethylacetamide, N,N,N',N'-tetraacetylethylenediamine and 1-methyl-2-pyrrolidone.

Of these, in terms of reaction efficiency and availability, N,N-dimethylformamide is preferred.

Examples of urethane compounds include N-methoxycarbonyl maleimide, 3-methyl-2-oxazolidone, 1-ethoxycarbonyl-4-piperidone and 1-tert-butoxycarbonyl pyrrolidine. Examples of urea compounds include tetramethylurea, 1,3-dimethyl-3,4,5,6-tetrahydro-2(1H)-pyrimidinone, 1,1,3,3-tetraethylurea, 1,1,3,3-tetrabutylurea, N,N'-dimethyl-N,N'-diphenylurea, 1,3-dimethyl-2-imidazolidinone, 1,3-dimethyluracil, 1,3-dimethylbarbituric acid and caffeine. Of these, in terms of reaction efficiency and availability, tetramethylurea, 1,3-dimethyl-3,4,5,6-tetrahydro-2(1H)-pyrimidinone and 1,3-dimethyl-2-imidazolidinone are preferred.

With the exception of phosphoric triamides such as hexamethylphosphoric triamide (HMPA) which are carcinogenic, any phosphorus compound having a P=O bond may be used as the phosphorus compound having a P=O bond. From the standpoint of reaction efficiency, a phosphine oxide is preferred.

Examples of phosphorus compounds having a P=O bond include trimethylphosphine oxide, triethylphosphine oxide, tri-n-propylphosphine oxide, tributylphosphine oxide, tri-n-octylphosphine oxide, tris(2-ethylhexyl)phosphine oxide, tricyclohexylphosphine oxide, triphenylphosphine oxide, methyl(diphenyl)phosphine oxide, ethyldiphenylphosphine oxide, diphenylvinylphosphine oxide, ethynyl(diphenyl) phosphine oxide, methoxymethyl(diphenyl)phosphine oxide, cyclohexyldiphenylphosphine oxide, (4-bromophenyl)diphenylphosphine oxide, (3-bromophenyl)diphenylphosphine oxide, bis(4-bromophenyl)phenylphosphine oxide, bis(3-bromophenyl)phenylphosphine oxide, tris(3-bromophenyl)phosphine oxide, tris(4-methylphenyl)phosphine oxide, 2,5-dihydroxyphenyl(diphenyl)phosphine oxide, diphenyl(2,4,6-trimethylbenzoyl)phosphine oxide, phenylbis(2,4,6-trimethylbenzoyl)phosphine oxide, 3-methyl-1-phenyl-2-phospholen-1-oxide, [(N,N-diisobutylcarbamoyl)methyl]octylphenylphosphine oxide, 1,2-bis (diphenylphosphino)ethane monoxide, 1,3-bis(diphenylphosphino)propane monoxide, 1,8-bis (diphenylphosphinyl) naphthalene, bis[2-[(oxo) diphenylphosphino]phenyl] ether, 2,8-bis (diphenylphosphoryl) dibenzo[b,d]furan, phosphoric acid, methyl phosphate, phenyl phosphate, dimethyl phosphate, dibutyl phosphate, diphenyl phosphate, trimethyl phosphate, tributyl phosphate, triallyl phosphate, triphenyl phosphate, tris(trimethylsilyl) phosphate, methylphosphonic acid, butylphosphonic acid, vinylphosphonic acid, phenylphosphonic acid, dimethylphosphinic acid, diphenylphosphinic acid, dimethyl methylphosphonate, diethyl vinylphosphonate, methylenediphosphonic acid, tetraisopropyl methylenediphosphonate, dimethyl phosphite, dibutyl phosphite and diphenyl phosphate. Of these, from the standpoint of reaction efficiency and availability, trimethylphosphine oxide, triethylphosphine oxide, tri-n-propylphosphine oxide, tributylphosphine oxide, tri-n-octylphosphine oxide, tris(2-ethylhexyl)phosphine oxide, tricyclohexylphosphine oxide, triphenylphosphine oxide, methyl(diphenyl)phosphine oxide, ethyldiphenylphosphine oxide, diphenylvinylphosphine oxide, ethynyl(diphenyl)phosphine oxide, methoxymethyl(diphenyl)phosphine oxide and cyclohexyldiphenylphosphine oxide are preferred.

Any quaternary ammonium salts and quaternary phosphonium salts may be used as the quaternary ammonium salt and quaternary phosphonium salt.

Examples of quaternary ammonium salts include tetrabutylammonium bromide, tetrabutylammonium chloride, tetrapropylammonium bromide and methyltri-n-octylammonium chloride. Examples of quaternary phosphonium salts include tetrabutylphosphonium bromide, tetrabutylphosphonium chloride and methyltriphenylphosphonium bromide. Of these, from the standpoint of reaction efficiency and availability, methyltri-n-octylammonium chloride and tetrabutylphosphonium bromide are preferred.

The catalyst is used in an amount which is preferably from 0.0001 to 5 moles, more preferably from 0.0005 to 3 moles, and even more preferably from 0.001 to 1 mole, per mole of the dihalosilane of general formula (2). By setting the amount to at least 0.0001 mole, more satisfactory catalyst effects can be obtained, but an amount in excess of 5 moles may be economically disadvantageous. When the amount of use is high, it is assumed that the catalyst is to be used as a reaction solvent.

The reaction temperature of the ring-opening reaction is not particularly limited, but is preferably between −10° C. and 150° C., and more preferably between 0° C. and 100° C. A reaction temperature above 150° C. may be economically disadvantageous and by-products of a sort that lead to a decrease in yield may arise. On the other hand, at a reaction temperature below −10° C., the reaction rate may become too slow.

In the ring-opening reaction, there is no particular limitation on the method and sequence in which the reaction starting materials are mixed together. Any of the following is possible: mixing together the formula (1) compound, the formula (2) compound and the catalyst all at once; adding the catalyst to a mixture of the formula (1) compound and the formula (2) compound; adding the formula (2) compound or the formula (1) compound in a dropwise manner to a mixture of the formula (1) compound or the formula (2) compound and the catalyst; adding a mixture of the formula (2) compound or the formula (1) compound and the catalyst in a dropwise manner to the formula (1) compound or the formula (2) compound; and reacting the formula (1) compound and the formula (2) compound in the catalyst or in a mixture of the catalyst and the solvent, this latter method involving specifically the dropwise addition of the formula (1) compound and the formula (2) compound, either separately or in admixture, to the catalyst or a mixture of the catalyst and the solvent.

Although the reaction solvent is not inherently an essential substance in the ring-opening reaction, it may be optionally used in order to, for example, improve the uniformity of the reaction system or increase the volume of the reaction system and improve the stirrability. The solvent may be of one type used alone or two or more may be used in suitable combination. Examples of the solvent include aromatic hydrocarbon solvents such as toluene, xylene, ethylbenzene and mesitylene; aliphatic hydrocarbon solvents such as hexane, heptane, octane, isooctane, decane, undecane, dodecane, tetradecane, hexadecane, cyclohexane, methylcyclohexane and paraffin; hydrocarbon solvents such as industrial gasoline (rubber solvent, etc.), petroleum benzine and solvent naphtha; ketone solvents such as acetone, methyl ethyl ketone, 2-pentanone, 3-pentanone, 2-hexanone, 2-heptanone, 4-heptanone, methyl isobutyl ketone, diisobutyl ketone, acetonylacetone and cyclohexanone; ester solvents such as ethyl acetate, propyl acetate, isopropyl acetate, butyl acetate and isobutyl acetate; ether solvents such as diethyl ether, dipropyl ether, diisopropyl ether, dibutyl ether, 1,2-dimethoxyethane, 1,4-dioxane and tetrahydrofuran; solvents having ester and ether moieties, such as 2-methoxyethyl acetate, 2-ethoxyethyl acetate, propylene glycol monomethyl ether acetate and 2-butoxyethyl acetate; siloxane solvents such as hexamethyl disiloxane, octamethyl trisiloxane and dimethyl silicone oil; nitrile solvents such as acetonitrile; chlorinated hydrocarbon solvents such as methylene chloride, chloroform and carbon tetrachloride; fluorine-modified aromatic hydrocarbon solvents such as m-xylene hexafluoride and benzotrifluoride; fluorine-modified ether solvents such as methyl perfluorobutyl ether, ethyl perfluorobutyl ether and perfluoro(2-butyltetrahydrofuran); and dimethylsulfoxide.

Of these, aromatic hydrocarbon solvents, aliphatic hydrocarbon solvents, ketone solvents, ester solvents, nitrile solvents, fluorine-modified aromatic hydrocarbon solvents and dimethylsulfoxide are preferred. Toluene, hexane, heptane, acetone, methyl ethyl ketone, methyl isobutyl ketone, ethyl acetate, acetonitrile, m-xylene hexafluoride and dimethylsulfoxide are more preferred. Solvents which may react with the dihalosilane of general formula (2) serving as one of the starting materials, such as alcohols and amines, are undesirable.

In cases where the cyclic siloxane serving as a starting material is a solid, there is no need for it to be uniformly dissolved in an organic solvent; the ring-opening reaction may be carried out with the cyclic siloxane in a partially dissolved state.

The amount of solvent used per 100 parts by weight of the combined amount of cyclic siloxane and dihalosilane serving as the starting materials is preferably from 1 to 1,000 parts by weight, and more preferably from 5 to 300 parts by weight.

The pressure conditions for the ring-opening reaction are not particularly limited. The reaction may be carried out either under normal pressure or under applied pressure, although atmospheric pressure conditions generally suffice.

The atmosphere of the reaction system for the ring-opening reaction is not particularly limited. However, in order to handle flammable compounds, from the standpoint of disaster prevention, an inert gas atmosphere is generally desirable. Specific examples of inert gases include nitrogen, argon and the like.

A reaction time for the ring-opening reaction of from 0.1 to 100 hours, preferably from 1 to 50 hours, is sufficient. At less than 0.1 hour, the reaction may be incomplete or the reaction may proceed abruptly in a short time, as a result of which the temperature within the system may rise suddenly due to the heat of reaction. A reaction time of more than 100 hours may be economically disadvantageous.

Step [II]

Describing Step (II) in greater detail, this is a step in which the cyclic polysiloxane of general formula (3) that is the target substance of the invention is obtained by reacting the linear polysiloxane of general formula (3") which is capped at both ends of the molecular chain with halogen atoms, this being the product of the ring-opening reaction represented by reaction formula (1) above, with water to induce hydrolytic condensation between halogen groups at both ends and form a cyclic structure within the molecule. This is called the "hydrolysis reaction" and is represented by reaction formula (II) below. In this formula, X, $R^1$, $R^2$, $R^3$, $R^4$ and b are the same as defined above.

[Chem. 19]

Reaction formula (II)

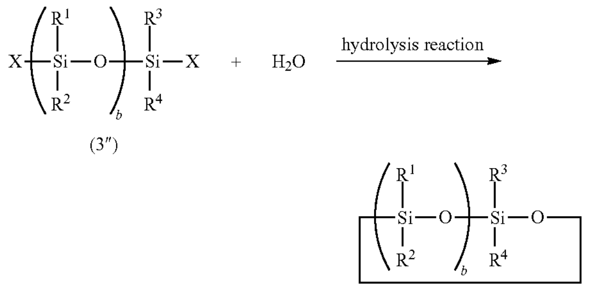

(3")

(3)

In the hydrolysis reaction, the molar ratio between the water and the linear polysiloxane of general formula (3") that is capped at both ends of the molecular chain with halogen atoms may be any suitable ratio without particular limitation. The amount of water per mole of the compound of formula (3") is preferably from 1 to 1,000 moles, and more preferably from 2 to 100 moles. At less than 1 mole, a condition in which the water is stoichiometrically insufficient arises and unreacted compound of formula (3") ends up remaining. On the other hand, an amount exceeding 1,000 moles may be economically disadvantageous.

The temperature of the hydrolysis reaction, although not particularly limited, is preferably between −10° C. and 100° C., and more preferably between 0° C. and 80° C. At a reaction temperature above 100° C., the water boils, which may cause bumping or the like and impurities may arise. On the other hand, when the reaction temperature is lower than −10° C., the water solidifies, which may adversely affect the stirrability, and the reaction rate may become too slow.

In the hydrolysis reaction, there is no particular limitation on the method of mixing the reaction starting material. Water may be added dropwise to the reaction mixture from the ring-opening reaction (I) that includes the linear polysiloxane of general formula (3") capped at both ends of the molecular chain with halogen atoms, or this reaction mixture may be added dropwise to the water.

An organic solvent may be optionally used in the hydrolysis reaction. The organic solvent may be added before the reaction or may be added after the reaction. Examples of the solvent include aromatic hydrocarbon solvents such as toluene, xylene, ethylbenzene and mesitylene; aliphatic hydrocarbon solvents such as hexane, heptane, octane, isooctane, decane, undecane, dodecane, tetradecane, hexadecane, cyclohexane, methylcyclohexane and paraffin; hydrocarbon solvents such as industrial gasoline (rubber solvent, etc.), petroleum benzine and solvent naphtha; ketone solvents such as acetone, methyl ethyl ketone, 2-pentanone, 3-poentanone, 2-hexanone, 2-heptanone, 4-heptanone, methyl isobutyl ketone, diisobutyl ketone, acetonylacetone and cyclohexanone; ester solvents such as ethyl acetate, propyl acetate, isopropyl acetate, butyl acetate and isobutyl acetate; ether solvents such as diethyl ether, dipropyl ether, diisopropyl ether, dibutyl ether, 1,2-dimethoxyethane, 1,4-dioxane and tetrahydrofuran; solvents having ester and ether moieties, such as 2-methoxyethyl acetate, 2-ethoxyethyl acetate, propylene glycol monomethyl ether acetate and 2-butoxyethyl acetate; alcohol solvents such as methanol, ethanol, 1-propanol, 2-propanol and 1-butanol; siloxane solvents such as hexamethyl disiloxane, octamethyl trisiloxane and dimethyl silicone oil; nitrile solvents such as acetonitrile; chlorinated hydrocarbon solvents such as methylene chloride, chloroform and carbon tetrachloride; fluorine-modified aromatic hydrocarbon solvents such as m-xylene hexafluoride and benzotrifluoride; fluorine-modified ether solvents such as methyl perfluorobutyl ether, ethyl perfluorobutyl ether and perfluoro(2-butyltetrahydrofuran); and dimethylsulfoxide.

Of these, aromatic hydrocarbon solvents, aliphatic hydrocarbon solvents, ketone solvents, ester solvents, ether solvents, alcohol solvents, nitrile solvents, fluorine-modified aromatic hydrocarbon solvents and dimethylsulfoxide are preferred. Toluene, hexane, heptane, acetone, methyl ethyl ketone, methyl isobutyl ketone, ethyl acetate, methanol, ethanol, 1-propanol, 2-propanol, acetonitrile, m-xylene hexafluoride and dimethylsulfoxide are more preferred. These may be used singly or two or more may be used in combination.

The amount of solvent used per 100 parts by weight of the linear polysiloxane of general formula (3") capped at both ends of the molecular chain with halogen atoms that serves as the intermediate is preferably from 1 to 1,000 parts by weight, and more preferably from 5 to 500 parts by weight.

The pressure conditions for the hydrolysis reaction are not particularly limited. The reaction may be carried out either under normal pressure or under applied pressure, although atmospheric pressure conditions generally suffice.

The atmosphere of the reaction system for the hydrolysis reaction is not particularly limited. However, in order to handle flammable compounds, from the standpoint of disaster prevention, an inert gas atmosphere is generally desirable. Specific examples of inert gases include nitrogen, argon and the like.

A reaction time for the hydrolysis reaction of preferably from 0.1 to 100 hours, and more preferably from 1 to 50 hours, suffices. At less than 0.1 hour, the reaction may be incomplete. A reaction time of more than 100 hours is long and may be economically disadvantageous.

Following the hydrolysis reaction, the organic phase may be washed with water by a known means. A commercial drying agent such as $Na_2SO_4$, $MgSO_4$ or $CaCl_2$ may be used to remove residual moisture after rinsing.

The method of removing the cyclic polysiloxane of formula (3) which is the target substance from the reaction mixture is not particularly limited. Exemplary methods include removing low-molecular-weight ingredients such as the solvent and starting materials by evaporation; distilling off the cyclic polysiloxane of formula (3) which is the target substance; and adding a poor solvent such as water or methanol to the reaction mixture so as to cause the target substance to deposit out, and then drying the target substance.

[Cyclic Polysiloxane (Target Substance)]

The cyclic polysiloxane that is the target substance of this invention is a compound of general formula (3) below

[Chem. 20]

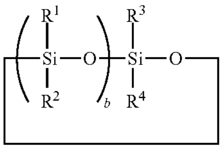

(3)

(wherein $R^1$ and $R^2$ are each independently a hydrogen atom or a substituted or unsubstituted monovalent hydrocarbon group of 1 to 10 carbon atoms, $R^3$ and $R^4$ are each independently a hydrogen atom or a substituted or unsubstituted monovalent hydrocarbon group of 1 to 20 carbon atoms (exclusive of fluorine-containing monovalent hydrocarbon groups), and b is an integer such that $3 \leq b \leq 10$).

Here, $R^1$, $R^2$, $R^3$ and $R^4$ are as defined above in formulas (1) and (2) above, and b is an integer such that $3 \leq b \leq 10$, preferably $3 \leq b \leq 6$, and more preferably b=3 (above general formula (3)).

Cyclic polysiloxanes obtained by the production method of the invention are industrially useful as modifiers which, through use as an additive in silicone resins and silicone oils or as a polymerizable monomer, further enhance the characteristics of various high-molecular-weight materials and impart novel properties. In addition, they can be used as diluents for cosmetic materials, as dry cleaning solvents and as dielectric film-forming materials.

EXAMPLES

The invention is illustrated more fully below by way of Examples, although the invention is not limited by these Examples. In the Examples, "Me" stands for a methyl group, "Vi" stands for a vinyl group and "Ph" stands for a phenyl group.

Example 1

A four-neck flask equipped with a stirrer and a thermometer and thoroughly flushed with nitrogen was charged with hexamethylcyclotrisiloxane (222.5 g, 1.00 mol), dichloromethylvinylsilane (141.1 g, 1.00 mol), hexane (136.3 g) and methyl ethyl ketone (45.4 g). Next, under stirring, tri-n-octylphosphine oxide (3.87 g, 0.01 mol) was added as the catalyst and stirring was carried out at room temperature (25° C.) under a nitrogen atmosphere. After 5 hours, disappearance of the starting materials was confirmed by gas chromatographic analysis. The produced amount of the ring-opening reaction intermediate-linear polysiloxane (3'-1) capped at both ends of the molecular chain with halogen atoms—was about 96 GC %.

Next, a different four-neck flask equipped with a stirrer and thermometer and thoroughly flushed with nitrogen was charged with hexane (330 g), methanol (100 g) and water (100 g, 5.56 mol) and, under ice cooling and stirring, the above ring-opening reaction intermediate solution was added dropwise thereto at 10° C. or below over a period of 2 hours. Following the completion of dropwise addition, the system was stirred at 10° C. or below for 1 hour and disappearance of the ring-opening reaction intermediate was confirmed by gas chromatographic analysis. The aqueous phase was then removed with a separatory funnel, and the step of adding water (500 g) and washing the organic phase was carried out repeatedly (three times). The organic phase was recovered and was dried over anhydrous sodium sulfate (10 g) for 1 hour. Next, 260.1 g of the target substance was fractionally distilled by vacuum distillation.

Figure 2:
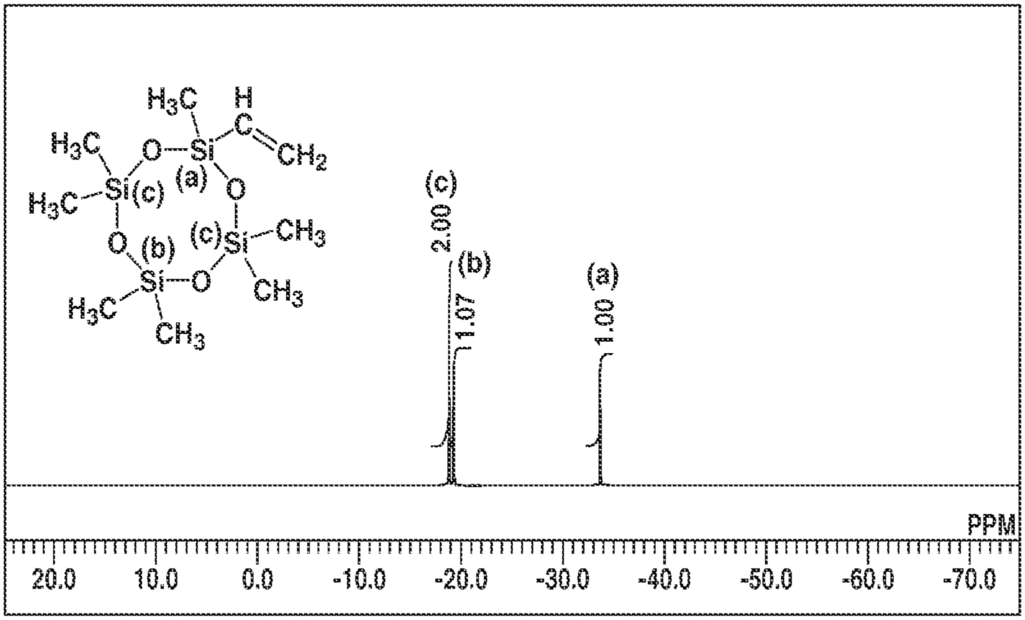
FIG. 2 shows the $^{29}$H-NMR spectrum (solvent, $CDCl_3$) for the cyclic polysiloxane (3-1) obtained in Example 1.

The target substance obtained after vacuum distillation was measured by $^{1}$H-NMR and $^{29}$Si-NMR, whereupon the target substance was identified as having formula (3-1) below. The yield of the target substance was 84%, and the purity upon gas chromatographic analysis was 96 GC %. FIG. 1 shows the $^{1}$H-NMR spectrum (solvent, $CDCl_3$) of the resulting cyclic polysiloxane (3-1). FIG. 2 shows the $^{29}$Si-NMR spectrum (solvent, $CDCl_3$) of the resulting cyclic polysiloxane (3-1).

[Chem. 21]

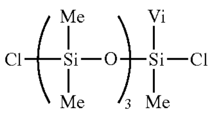

(3'-1)

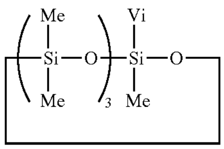

(3-1)

Example 2

Aside from using 1,3-dimethyl-3,4,5,6-tetrahydro-2(1H)-pyrimidinone (6.41 g, 0.05 mol) as the catalyst instead of tri-n-octylphosphine oxide (3.87 g, 0.01 mol), the reaction was carried out in the same way as in Example 1. After 5 hours of ring-opening reaction, the produced amount of the intermediate-linear polysiloxane (3'-1) capped at both ends of the molecular chain with halogen atoms—was about 89

GC %. The yield of cyclic polysiloxane (3-1) likewise obtained by a hydrolysis reaction and by purification via distillation was 238.1 g (yield, 77%), and the purity was 94 GC %.

Example 3

Aside from using methyltri-n-octylammonium chloride (20.21 g, 0.05 mol) as the catalyst instead of tri-n-octylphosphine oxide (3.87 g, 0.01 mol), the reaction was carried out in the same way as in Example 1. After 5 hours of ring-opening reaction, the produced amount of the intermediate-linear polysiloxane (3'-1) capped at both ends of the molecular chain with halogen atoms—was about 83 GC %. The yield of cyclic polysiloxane (3-1) likewise obtained by a hydrolysis reaction and by purification via distillation was 221.8 g (yield, 72%), and the purity was 93 GC %.

Example 4

Figure 3:
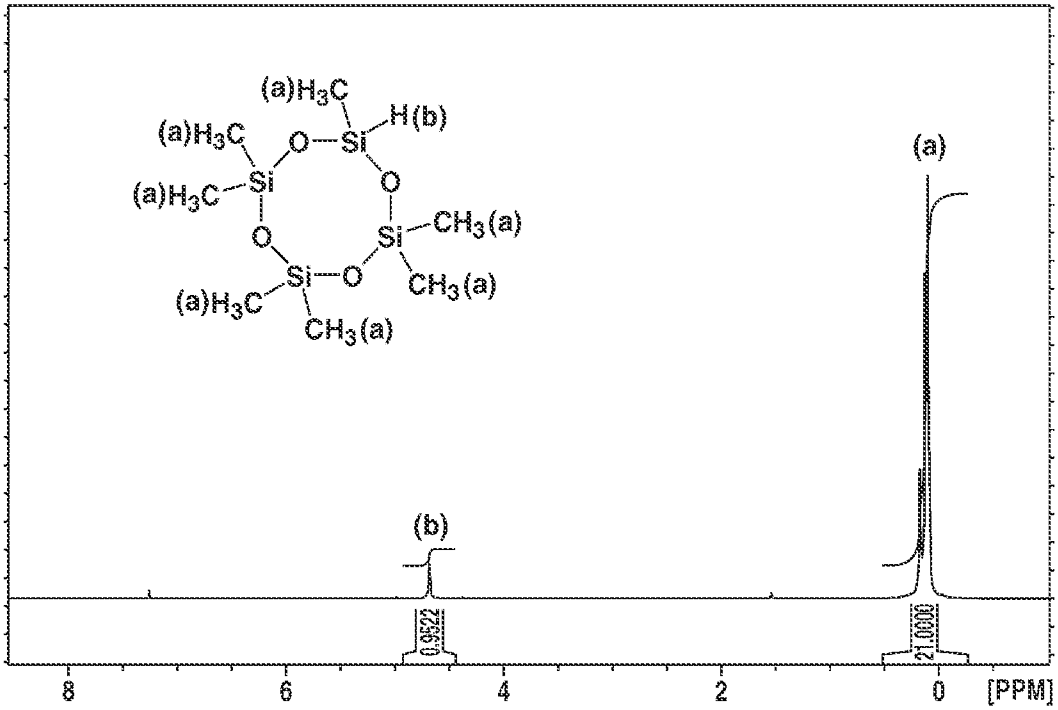
FIG. 3 shows the $^1$H-NMR spectrum (solvent, $CDCl_3$) for the cyclic polysiloxane (3-2) obtained in Example 4.
Figure 4:
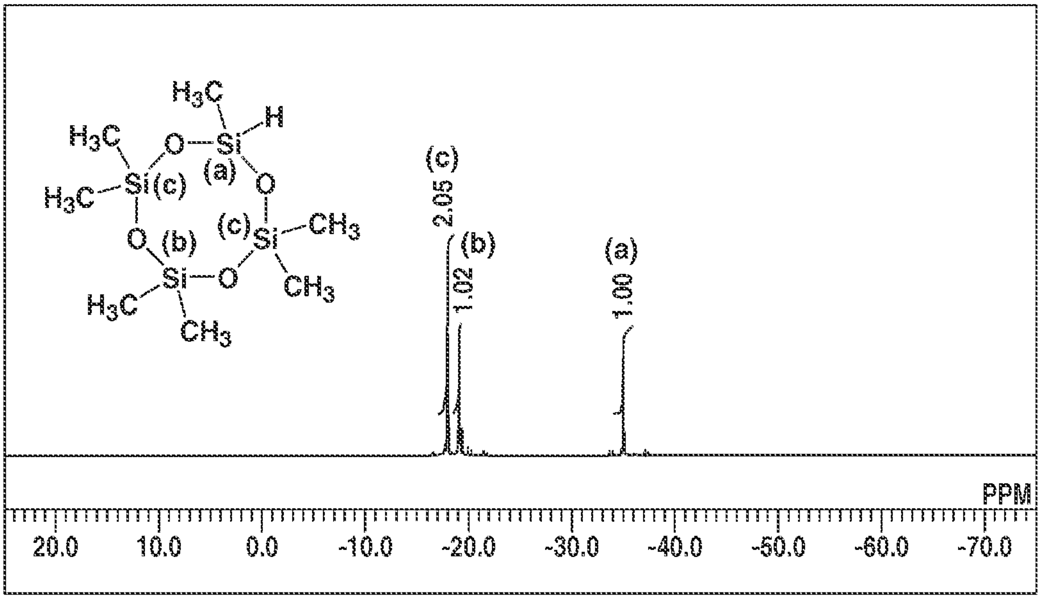
FIG. 4 shows the $^{29}$H-NMR spectrum (solvent, $CDCl_3$) for the cyclic polysiloxane (3-2) obtained in Example 4.

Aside from using dichloromethylsilane (115.0 g, 1.00 mol) as the dihalosilane instead of dichloromethylvinylsilane (141.1 g, 1.00 mol), the reaction was carried out in the same way as in Example 1. After 5 hours of ring-opening reaction, the produced amount of the intermediate-linear polysiloxane (3'-2) capped at both ends of the molecular chain with halogen atoms—was about 86 GC %. The yield of cyclic polysiloxane (3-2) likewise obtained by a hydrolysis reaction and by purification via distillation was 211.2 g (yield, 75%), and the purity was 79 GC %. FIG. 3 shows the $^1$H-NMR spectrum (solvent, $CDCl_3$) of the resulting cyclic polysiloxane (3-2). FIG. 4 shows the $^{29}$Si-NMR spectrum (solvent, $CDCl_3$) of the resulting cyclic polysiloxane (3-2).

[Chem. 22]

(3'-2)

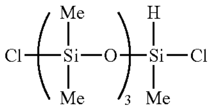

(3-2)

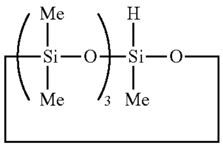

Example 5

Aside from using 1,3-dimethyl-3,4,5,6-tetrahydro-2(1H)-pyrimidinone (6.41 g, 0.05 mol) as the catalyst instead of tri-n-octylphosphine oxide (3.87 g, 0.01 mol), the reaction was carried out in the same way as in Example 4. After 5 hours of ring-opening reaction, the produced amount of the intermediate-linear polysiloxane (3'-2) capped at both ends of the molecular chain with halogen atoms—was about 84 GC %. The yield of cyclic polysiloxane (3-2) likewise obtained by a hydrolysis reaction and by purification via distillation was 200.2 g (yield, 73%), and the purity was 78 GC %.

Example 6

Figure 5:
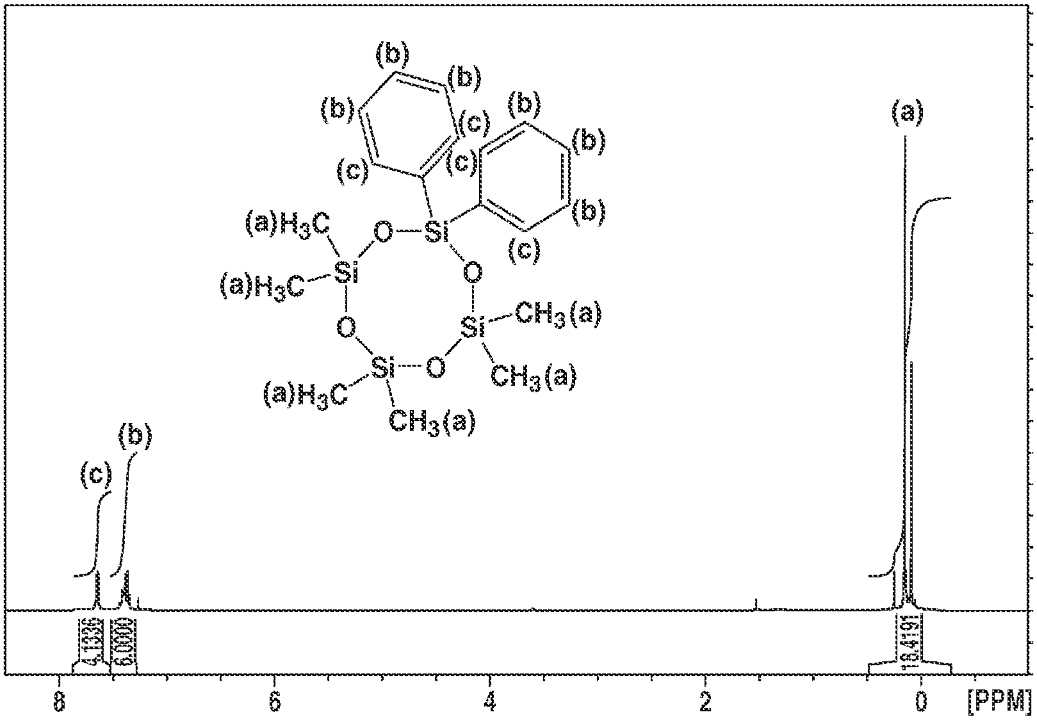
FIG. 5 shows the $^1$H-NMR spectrum (solvent, $CDCl_3$) for the cyclic polysiloxane (3-3) obtained in Example 4.
Figure 6:
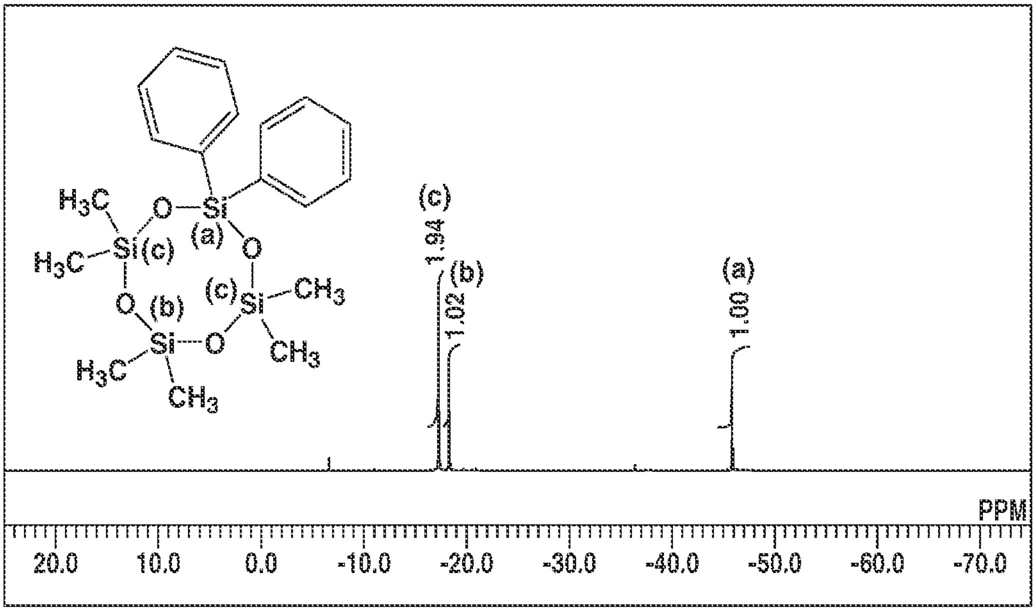
FIG. 6 shows the $^{29}$H-NMR spectrum (solvent, $CDCl_3$) for the cyclic polysiloxane (3-3) obtained in Example 4.

Aside from using dichlorodiphenylsilane (253.2 g, 1.00 mol) as the dihalosilane instead of dichloromethylvinylsilane (141.1 g, 1.00 mol), the reaction was carried out in the same way as in Example 1. After 5 hours of ring-opening reaction, the produced amount of the intermediate-linear polysiloxane (3'-3) capped at both ends of the molecular chain with halogen atoms—was about 94 GC %. The yield of cyclic polysiloxane (3-3) likewise obtained by a hydrolysis reaction and by purification via distillation was 322.1 g (yield, 77%), and the purity was 92 GC %. FIG. 5 shows the $^1$H-NMR spectrum (solvent, $CDCl_3$) of the resulting cyclic polysiloxane (3-3). FIG. 6 shows the $^{29}$Si-NMR spectrum (solvent, $CDCl_3$) of the resulting cyclic polysiloxane (3-3).

[Chem. 23]

(3'-3)

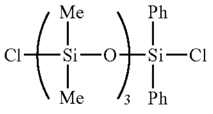

(3-3)

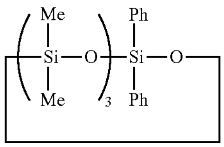

Example 7

Aside from using 1,3-dimethyl-3,4,5,6-tetrahydro-2(1H)-pyrimidinone (6.41 g, 0.05 mol) as the catalyst instead of tri-n-octylphosphine oxide (3.87 g, 0.01 mol), the reaction was carried out in the same way as in Example 6. After 5 hours of ring-opening reaction, the produced amount of the intermediate-linear polysiloxane (3'-3) capped at both ends of the molecular chain with halogen atoms—was about 86 GC %. The yield of cyclic polysiloxane (3-3) likewise obtained by a hydrolysis reaction and by purification via distillation was 300.1 g (yield, 71%), and the purity was 90 GC %.

Example 8

A four-neck flask equipped with a stirrer and a thermometer and thoroughly flushed with nitrogen was charged with 2,4,6-trimethyl-2,4,6-trivinylcyclotrisiloxane (258.5 g, 1.00 mol), dichlorodiphenylsilane (253.2 g, 1.00 mol), hexane (136.3 g) and methyl ethyl ketone (45.4 g). Next, tri-n-octylphosphine oxide (3.87 g, 0.01 mol) was added under stirring as the catalyst, and stirring was carried out at room temperature (25° C.) under a nitrogen atmosphere. After 5 hours, disappearance of the starting materials was confirmed by gas chromatographic analysis.

Next, a different four-neck flask equipped with a stirrer and thermometer and thoroughly flushed with nitrogen was charged with hexane (330 g), methanol (100 g) and water (100 g, 5.56 mol) and, under ice cooling and stirring, the above ring-opening reaction intermediate solution was added dropwise thereto at 10° C. or below over a period of 2 hours. Following the completion of dropwise addition, the system was stirred at 10° C. or below for 5 hours, after which the aqueous phase was removed with a separatory funnel and the step of adding water (500 g) and washing the organic phase was carried out repeatedly (three times). The organic phase was recovered and was dried over anhydrous sodium sulfate (10 g) for 1 hour. The solvent and low-molecular-weight ingredients were distilled off by drying in vacuo, giving 411.1 g of crude product. The resulting crude product was measured by $^1$H-NMR and $^{29}$Si-NMR, and the formation of product having formula (3-4) below was confirmed.

[Chem. 24]

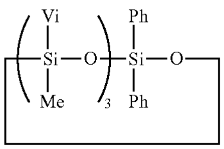

(3-4)

Example 9

Aside from using 1,3,5-tris(3,3,3-trifluoropropyl)-1,3,5-trimethylcyclotrisiloxane (468.5 g, 1.0 mol) as the starting cyclic siloxane instead of 2,4,6-trimethyl-2,4,6-trivinylcyclotrisiloxane (258.5 g, 1.00 mol), the reaction was carried out in the same way as in Example 8. After 5 hours of ring-opening reaction, disappearance of the starting materials was confirmed. A similar hydrolysis reaction was carried out, and the solvent and low-molecular-weight ingredients were distilled off by drying in vacuo, giving 605.2 g of crude product. The resulting crude product was measured by $^1$H-NMR Da and $^{29}$Si-NMR, and the formation of product having formula (3-5) below was confirmed.

[Chem. 25]

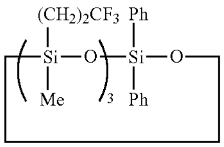

(3-5)

INDUSTRIAL APPLICABILITY

Cyclic polysiloxanes obtained by the inventive method for producing cyclic polysiloxanes, when used as additives in silicone resins and silicone oils or as polymerizable monomers, are industrially useful as modifiers which further enhance the characteristics of various high-molecular-weight materials and impart novel properties. In addition, they can be used as diluents for cosmetic materials, as dry cleaning solvents, and as dielectric film-forming materials.

The invention claimed is:

1. A method for producing a cyclic polysiloxane, comprising the steps of:

reacting a starting cyclic siloxane of general formula (1) below

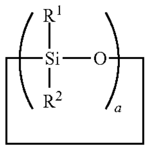

(1)

(wherein $R^1$ and $R^2$ are each independently a hydrogen atom or a substituted or unsubstituted monovalent hydrocarbon group of 1 to 10 carbon atoms, and the subscript 'a' is an integer such that $3 \leq a \leq 5$) with a dihalosilane of general formula (2) below (2)

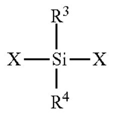

(wherein $R^3$ and $R^4$ are each independently a hydrogen atom or a substituted or unsubstituted monovalent hydrocarbon group of 1 to 20 carbon atoms (exclusive of fluorine-containing monovalent hydrocarbon groups), and X is a halogen atom), accompanied by ring opening of the cyclic siloxane of general formula (1), in the presence of one or more catalyst selected from phosphorus compounds having a P═O bond with the exception of phosphoric triamides to obtain a linear polysiloxane capped at both ends of the molecular chain with halogen atoms; and reacting the resulting linear polysiloxane capped at both ends of the molecular chain with halogen atoms with water in a hydrolysis reaction in an alcohol solvent to obtain a cyclic polysiloxane of general formula (3) below (3)

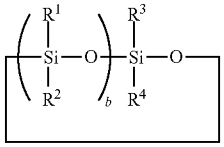

(wherein $R^1$ and $R^2$ are each independently a hydrogen atom or a substituted or unsubstituted monovalent hydrocarbon group of 1 to 10 carbon atoms, $R^3$ and $R^4$ are each independently a hydrogen atom or a substituted or unsubstituted monovalent hydrocarbon group of 1 to 20 carbon atoms (exclusive of fluorine-containing monovalent hydrocarbon groups), and the subscript 'b' is an integer such that $3 \leq b \leq 10$).

2. The cyclic polysiloxane production method of claim 1 wherein, in general formulas (1) and (3), $R^1$ and $R^2$ are each independently an unsubstituted monovalent hydrocarbon group of 1 to 10 carbon atoms.

3. The cyclic polysiloxane production method of claim 2 wherein, in general formulas (1) and (3), $R^1$ and $R^2$ are methyl groups.

4. The cyclic polysiloxane production method of claim 1 wherein, in general formulas (2) and (3), $R^3$ and $R^4$ are hydrogen atoms or unsubstituted monovalent hydrocarbon groups of 1 to 10 carbon atoms.

5. A method for producing a cyclic polysiloxane, comprising the steps of:

reacting a starting cyclic siloxane of general formula (1') below

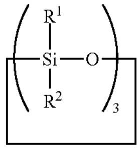
(1')

(wherein $R^1$ and $R^2$ are each independently a hydrogen atom or a substituted or unsubstituted monovalent hydrocarbon group of 1 to 10 carbon atoms) with a dichlorosilane of general formula (2') below

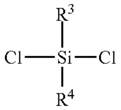
(2')

(wherein $R^3$ and $R^4$ are each independently a hydrogen atom or a substituted or unsubstituted monovalent hydrocarbon group of 1 to 20 carbon atoms (exclusive of fluorine-containing monovalent hydrocarbon groups)), accompanied by ring opening of the cyclic siloxane of general formula (1'), in the presence of one or more catalyst selected from phosphorus compounds having a P═O bond with the exception of phosphoric triamides to obtain a linear polysiloxane capped at both ends of the molecular chain with chlorine atoms; and reacting the resulting linear polysiloxane capped at both ends of the molecular chain with chlorine atoms with water in a hydrolysis reaction in an alcohol solvent to obtain a cyclic polysiloxane of general formula (3') below

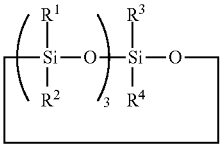
(3')

(wherein $R^1$ and $R^2$ are each independently a hydrogen atom or a substituted or unsubstituted monovalent hydrocarbon group of 1 to 10 carbon atoms, and $R^3$ and $R^4$ are each independently a hydrogen atom or a substituted or unsubstituted monovalent hydrocarbon group of 1 to 20 carbon atoms (exclusive of fluorine-containing monovalent hydrocarbon groups)).

6. The cyclic polysiloxane production method of claim 5 wherein, in general formulas (1') and (3'), $R^1$ and $R^2$ are each independently an unsubstituted monovalent hydrocarbon group of 1 to 10 carbon atoms.

7. The cyclic polysiloxane production method of claim 6 wherein, in general formulas (1') and (3'), $R^1$ and $R^2$ are methyl groups.

8. The cyclic polysiloxane production method of claim 5 wherein, in general formulas (2') and (3'), $R^3$ and $R^4$ are hydrogen atoms or unsubstituted monovalent hydrocarbon groups of 1 to 10 carbon atoms.

9. The cyclic polysiloxane production method of claim 1, wherein the catalyst is one or more selected from the group consisting of trimethylphosphine oxide, triethylphosphine oxide, tri-n-propylphosphine oxide, tributylphosphine oxide, tri-n-octylphosphine oxide, tris(2-ethylhexyl)phosphine oxide, tricyclohexylphosphine oxide, triphenylphosphine oxide, methyl(diphenyl)phosphine oxide, ethyldiphenylphosphine oxide, diphenylvinylphosphine oxide, ethynyl (diphenyl)phosphine oxide, methoxymethyl(diphenyl) phosphine oxide, cyclohexyldiphenylphosphine oxide, (4 bromophenyl)diphenylphosphine oxide, (3-bromophenyl) diphenylphosphine oxide, bis(4-bromophenyl)phenylphosphine oxide, bis(3-bromophenyl)phenylphosphine oxide, tris(3-bromophenyl)phosphine oxide, tris(4-methylphenyl) phosphine oxide, 2,5 dihydroxyphenyl(diphenyl)phosphine oxide, diphenyl (2,4,6 trimethylbenzoyl) phosphine oxide, phenylbis(2,4,6 trimethylbenzoyl) phosphine oxide, 3-methyl-1-phenyl-2-phospholen-1-oxide, [(N,N-diisobutylcarbamoyl)methyl]octylphenylphosphine oxide, 1,2 bis (diphenylphosphino) ethane monoxide, 1,3-bis(diphenylphosphino) propane monoxide, 1,8-bis (diphenylphosphinyl) naphthalene, and bis[2-[(oxo) diphenylphosphino]phenyl] ether, 2,8-bis (diphenylphosphoryl) dibenzo[b,d]furan.

10. The cyclic polysiloxane production method of claim 5, wherein the catalyst is one or more selected from the group consisting of trimethylphosphine oxide, triethylphosphine oxide, tri-n-propylphosphine oxide, tributylphosphine oxide, tri-n-octylphosphine oxide, tris(2-ethylhexyl)phosphine oxide, tricyclohexylphosphine oxide, triphenylphosphine oxide, methyl(diphenyl)phosphine oxide, ethyldiphenylphosphine oxide, diphenylvinylphosphine oxide, ethynyl (diphenyl)phosphine oxide, methoxymethyl(diphenyl) phosphine oxide, cyclohexyldiphenylphosphine oxide, (4 bromophenyl)diphenylphosphine oxide, (3-bromophenyl) diphenylphosphine oxide, bis(4-bromophenyl)phenylphosphine oxide, bis(3-bromophenyl)phenylphosphine oxide, tris(3-bromophenyl)phosphine oxide, tris(4-methylphenyl) phosphine oxide, 2,5 dihydroxyphenyl(diphenyl)phosphine oxide, diphenyl (2,4,6 trimethylbenzoyl) phosphine oxide, phenylbis(2,4,6 trimethylbenzoyl) phosphine oxide, 3-methyl-1-phenyl-2-phospholen-1-oxide, [(N,N-diisobutylcarbamoyl)methyl]octylphenylphosphine oxide, 1,2 bis (diphenylphosphino) ethane monoxide, 1,3-bis(diphenylphosphino) propane monoxide, 1,8-bis (diphenylphosphinyl) naphthalene, and bis[2-[(oxo) diphenylphosphino]phenyl] ether, 2,8-bis (diphenylphosphoryl)dibenzo[b,d]furan.

11. The cyclic polysiloxane production method of claim 1, wherein the alcohol solvent is selected from the group consisting of methanol, ethanol, 1-propanol, 2-propanol and 1-butanol.

12. The cyclic polysiloxane production method of claim 1, wherein the alcohol solvent is methanol.

13. The cyclic polysiloxane production method of claim 1, wherein the linear polysiloxane capped at both ends of the molecular chain with halogen atoms is represented by general formula (3") below

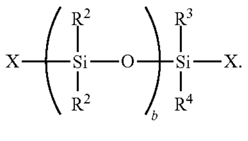
(3")

14. The cyclic polysiloxane production method of claim 13, wherein the amount of solvent used per 100 parts by weight of the linear polysiloxane of general formula (3")

capped at both ends of the molecular chain with halogen atoms that serves as the intermediate is from 1 to 1,000 parts by weight.

* * * * *